June 27, 1950  R. O. WESTENFELDER  2,513,072
GUIDE MAP FOR USE IN AUTOMOBILES AND AIRPLANES
Filed Nov. 19, 1946  4 Sheets-Sheet 1

*Inventor*
*Robert O. Westenfelder*

By *Clarence A. O'Brien and Harvey B. Jackson*
Attorneys

June 27, 1950     R. O. WESTENFELDER     2,513,072
GUIDE MAP FOR USE IN AUTOMOBILES AND AIRPLANES
Filed Nov. 19, 1946     4 Sheets-Sheet 2

Inventor
Robert O. Westenfelder

By *Attorneys*

June 27, 1950 R. O. WESTENFELDER 2,513,072
GUIDE MAP FOR USE IN AUTOMOBILES AND AIRPLANES
Filed Nov. 19, 1946 4 Sheets-Sheet 3

Inventor
Robert O. Westenfelder

By Clarence A. O'Brien
and Harvey B. Jacobson
Attorneys

June 27, 1950  R. O. WESTENFELDER  2,513,072
GUIDE MAP FOR USE IN AUTOMOBILES AND AIRPLANES
Filed Nov. 19, 1946  4 Sheets—Sheet 4

Inventor
Robert O. Westenfelder
By Clarence A. O'Brien
and Harvey B. Jacobson
Attorneys Patented June 27, 1950

2,513,072

UNITED STATES PATENT OFFICE 2,513,072

GUIDE MAP FOR USE IN AUTOMOBILES AND AIRPLANES

Robert O. Westenfelder, Portland, Oreg.

Application November 19, 1946, Serial No. 710,746

7 Claims. (Cl. 40—86)

1

This invention relates to improvements in visual route indicating devices for use in automobiles and aeroplanes.

An object of the invention is to provide an improved manually operated projection apparatus for indicating routes and other data on film for projecting upon a ground glass or opaque screen, said apparatus being adapted for use in connection with an automobile or aeroplane, whereby the operator of an automobile or aeroplane may have a visual and changeable route map directly in front of him to accurately furnish the required route information which will be checkable at all times with the actual route being traveled.

Another object of the invention is to provide an improved route indicating device for automobiles and aeroplanes comprising an outer casing and an inner casing slidably disposed within said outer casing, together with a ground glass or opaque viewing screen and a projector adapted to operate with interchangeable rolls of route indicating film, and separate means under the control of the operator of the automobile or aeroplane for advancing the film continuously in one direction as the automobile or aeroplane moves over the route indicated on the film, and further means for moving the film forwardly or backwardly in step by step manner while obtaining a close check on the route to be traveled.

A further object of the invention is to provide an improved route indicating apparatus including a film projector and interchangeable route maps in film form, together with a screen upon which the route being traveled may be displayed in enlarged scale, and magnifying scanning means movable over any portion of the screen whereby details of the route may be more clearly brought out and viewed.

Another object of the invention is to provide an improved form of route indicating device for automobiles and aeroplanes utilizing route maps on film and a projection apparatus, said device being highly efficient in operation and relatively inexpensive to manufacture and produce.

Other objects will appear as the description proceeds.

In the accompanying drawings which form a part of this application:

2

Figure 1:
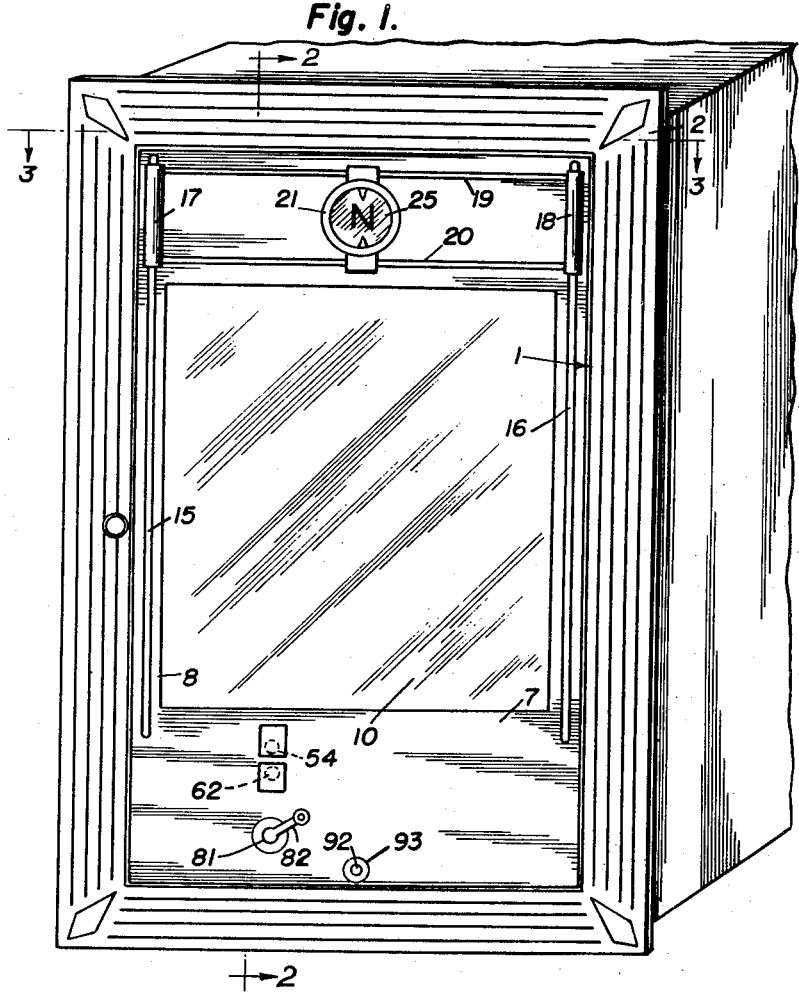
Figure 1 is a perspective view of the front portion of the improved guideomatic or film projected route indicating device.
Figure 2:
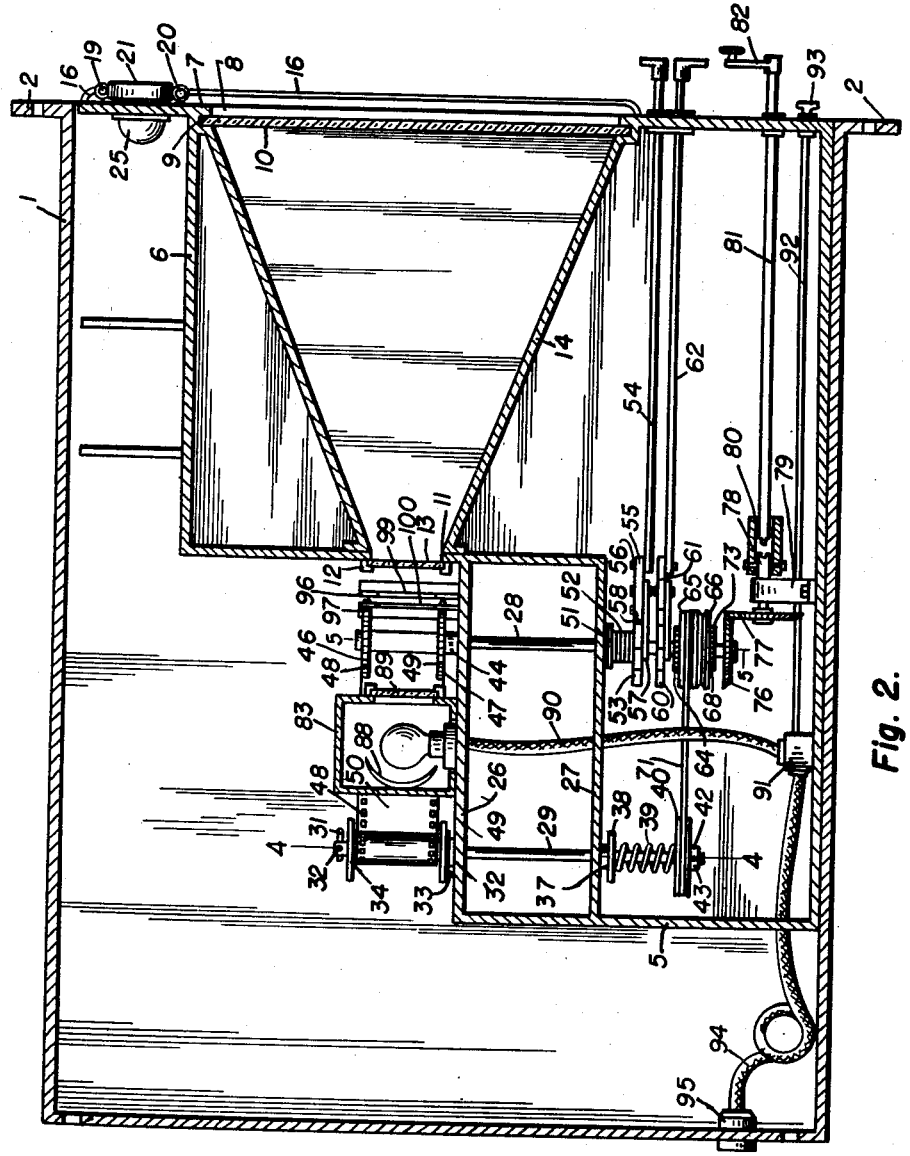
Figure 2 is a vertical sectional view through the improved film projected route indicating device taken on the line 2—2 of Figure 1.
Figure 5:
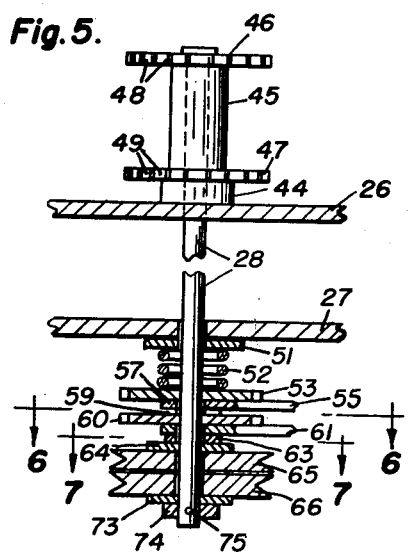
Figure 6:
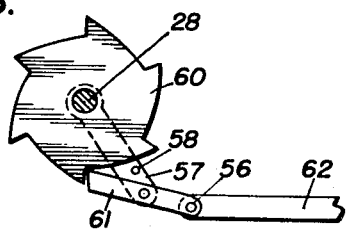
Figure 7:
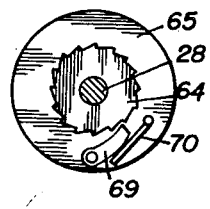
Figure 8:
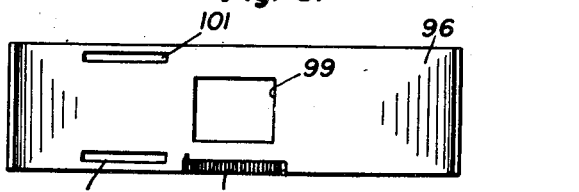

Figure 5 is a vertical sectional view taken on the line 5—5 of Figure 2;

Figure 6 is a plan view taken on the line 6—6 of Figure 5;

Figure 7 is a plan view taken on the line 7—7 of Figure 5;

Figure 8 is a front elevation of the film guide, and

Figure 9:
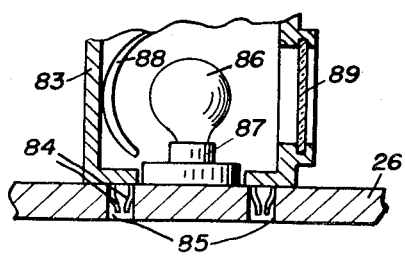

Figure 9 is an enlarged vertical sectional view through the reflector and lens housing for the projecting light.

Like characters of reference are used throughout the following specification and the accompanying drawings to designate corresponding parts.

In carrying out the invention, there is provided an improved form of visual route indicating device including an outer substantially rectangular shaped casing 1 formed with peripherally extending flanges 2 about its front end, the same being provided with the apertures 3 which cooperate with the apertures 4 formed through the outer wall of said casing for receiving bolts or screws (not shown), whereby the device may be supported adjacent the instrument panel or dash of an automobile or aeroplane.

An inner substantially rectangular shaped casing 5 is slidably and telescopically received within the outer casing 1 and includes the enlarged forwardly disposed portion 6 having a front panel 7 which is centrally apertured at 8, and is formed with an annular channel 9 in which the ground glass or opaque screen 10 is adapted to be supported. The rear or inner end of the portion 6 of the casing 5 is apertured at 11 and is formed with a peripheral flange 12 in which the lens 13 is disposed.

Figure 3:
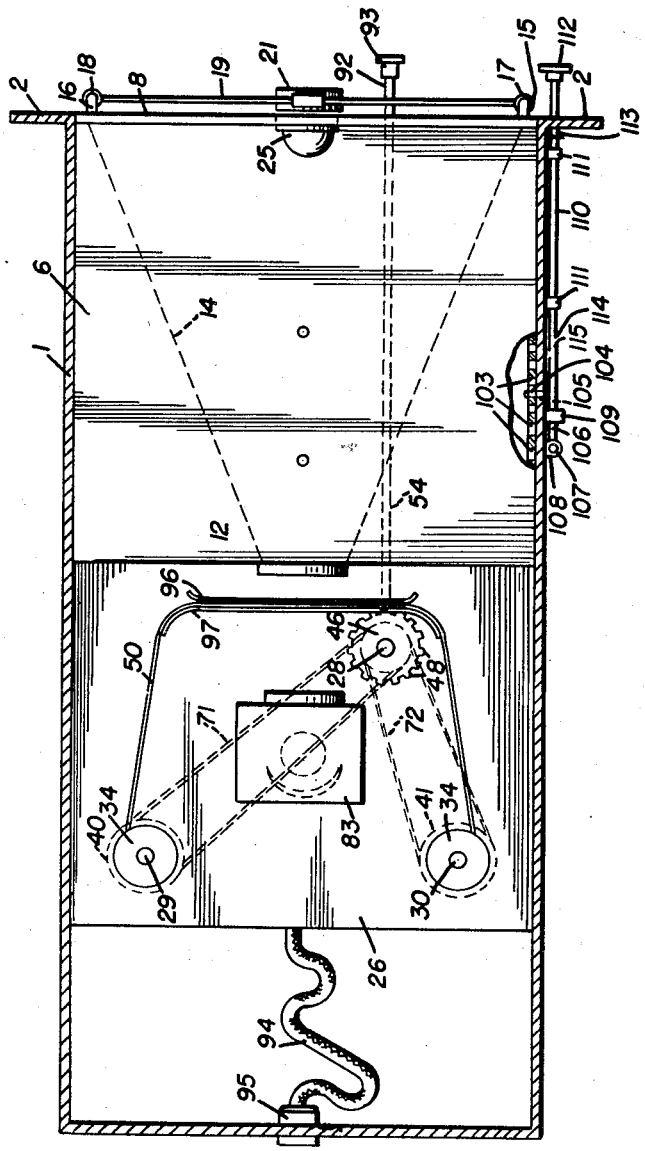
Figure 3 is a longitudinal sectional view through the improved film projected route indicating device taken on the line 3—3 of Figure 1.
Figure 4:
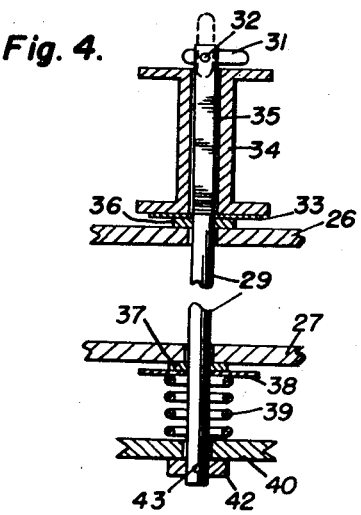
Figure 4 is a vertical sectional view taken on the line 4—4 of Figure 2.

A pyramidal baffle 14 is disposed between the front and rear apertures 8 and 11 in said portion 6 as clearly illustrated in Figures 2 and 3 of the drawings.

Vertically extending guide rods 15 and 16 are supported by the inner casing 5 to extend forwardly thereof, and are adapted to guide and support the sleeve members 17 and 18 for vertical adjustment, said sleeves being connected together by means of the horizontal spaced guide rods 19 and 20 to form a movable unit.

A magnifying lens 21 is disposed within the upper and lower integral guide sleeves 23 and 24 slidably mounted upon said guide rods 19 and 20, thereby permitting the magnifying glass 21 to be moved to cover any desired point in front of the screen 10.

A compass 25 will be fixed at the forward end of the inner casing 5, so that the direction of movement of the automobile or aeroplane may be known at all times.

The inner end of the inner casing 5 is formed with the spaced horizontally disposed walls 26 and 27 through which the vertical shafts 28, 29 and 30 are mounted for rotation.

Each of the shafts 29 and 30 are provided with the locking fingers 31 pivoted at 32 on their upper ends, and a supporting disk 33 is fixed to each shaft for supporting interchangeable film spools 34, which are disposed over the square shank portions 35 of said shafts 29 and 30. Washers 36 are disposed about the shafts 29 and 30 between the disks and the upper surface of the wall 26. Similar washers 37 are disposed about the shafts 29 and 30 immediately below the wall 26, and similar disks 38 are fixed to said shafts immediately below the washers 37.

Coil springs 39 are disposed over the lower ends of the shafts 29 and 30, and engage the adjacent sides of the pulleys 40 and 41 which are loosely supported on said shafts, being held in place by the collars 42 and cross locking pins 43, said pulleys being frictionally connected to said shafts 29 and 30 by means of the coil springs 39 exerting a frictional pressure or tension on said pulleys.

The shaft 28, hereinafter designated the driving shaft, supports a collar 44 which engages the upper surface of the wall 26 and a film driving spool 45 is disposed over the upper end of the shaft 28, and is provided with the upper and lower cog wheels 46 and 47 whose teeth or cogs are adapted to engage in the spaced slots or apertures and 49 formed through the upper and lower edges of the film 50.

A washer 51 is loosely mounted over the shaft 28 in contact with the lower surface of the lower wall 27, and a coil spring 52 is then disposed over said shaft immediately below the washer 51. The ratchet wheel 53 is fixed to the shaft 28 for frictional engagement with the lower end of said coil springs 52 and is adapted to be operated or rotated in a step by step manner as the operating shift lever 54 extending through the casing 5 to a point in front of the panel portion 7, is manually pushed inwardly, thereby causing the dog 55 hinged at 56 to the inner end of said lever 54 to engage one of the ratchet teeth 57 to rotate the ratchet wheel 53. The dog or pawl 55 is pivotally mounted upon pin 56 on the finger or bracket arm 57 disposed about the shaft 28 and extending radially therefrom. A stop pin 58 is disposed on the finger or arm 57 to limit the movement of said dog or pawl 55.

A washer 59 is disposed about the shaft 28 below the pawl 55, and a second ratchet wheel 60 is fixed about the shaft 28 below the washer 59. Ratchet wheels 53 and 60 are formed identically with each other, and the wheel 60 cooperates with the dog or pawl 61 pivotally mounted on the inner end of the second operating shift lever 62, which also extends through and in front of the panel portion 7. A similar mounting arm and stop for the pawl 61 are provided, and the only difference between said ratchet mechanisms being that one lever rotates its ratchet wheel in one direction, while the other lever rotates its associated ratchet wheel in the opposite direction.

A washer 63 is loosely mounted on the shaft 28 below the ratchet wheel 60, and a ratchet wheel 64 is fixed about the shaft 28 below the said washer 63.

The pulleys 65 and 66 are loosely mounted on the lower end of the shaft 28 and respectively cooperate with the ratchet wheels 64 and 73 fixed to said shaft 28. A collar 74 is placed over the shaft below the ratchet wheel 73, being held in place by a pin 75. Pivoted pawls 69 are mounted on the side of each pulley 65 and 68, and are pressed inwardly by means of the leaf springs 70, also supported on the sides of each of said pulleys, whereby one pulley is adapted to be locked to its ratchet wheel when the shaft 28 is rotated in one direction, and the other pulley is adapted to be locked to its ratchet wheel when the shaft 28 is rotated in the opposite or reverse direction.

Driving belts 71 and 72 will be connected respectively between the pulleys 40 and 65, and between the pulleys 41 and 66.

The extreme lower end of the shaft 28 supports a bevel gear 76 which in turns meshes with a bevel gear 77 on the rotatable stub shaft 78 mounted in the bracket 79. A coupling 80 is secured to the end of shaft 78 and is engageable with the splined end of the rotatable operating crank shaft 81 which extends through the front panel portion 7 and supports the hand crank 82 on its forward most end.

A lamp box 83 is disposed on the upper surface of the wall 26, and is supported by means of the spring fingers 84 which are insertably and removably positioned within the apertures or openings 85 in said wall 26.

A lamp bulb 86 is received in electric sockets 87 in said lamp box 83, and cooperates with a reflector 88 and with a lens 89 disposed in the front wall of said lamp box 83.

Electric two wire cable 90 connects the socket 87 with a switch 91 which is remotely operated by the rod 92 extending through the front panel portion 7 of the casing 1, and is adapted to support the operating knob 93 fixed upon its forward most end.

A flexible electric cable 94 connects the switch 91 with a plug 95 in the inner end of the casing or housing 1 for attaching an electric cable (not shown) from a suitable source of electrical energy also (not shown).

An improved form of film guide is provided and includes the front and back plates 96 and 97, the same being hinged at 98 with their opposite ends bent or curved rearwardly.

Aligned openings 99 and 100 will be formed through the plates 96 and 97 to frame one picture at a time on the film 50, which will be secured on the film spools 34 to extend from one shaft 29 to pass between the plates 96 and 97 and then to the other film spool 34 on the shaft 30.

Slots 101 and 102 will be formed through the plates 96 and 97 through which the sprocket drive wheels 46 and 47 may extend while engaging the slots 48 and 49 formed along the upper and lower edges of said roll or spool of film 50, for driving the same in either direction.

It has been found desirable at times when the light is extremely bright while driving or riding in the automobile or aeroplane to push the inner casing 5 back somewhat into the interior of the outer casing 1, so that the ground glass or opaque screen 10 will be set inwardly, and the pictures as they are projected thereon will be more clearly viewed. To accomplish this result, the inner casing 5 is formed with a longitudinally extending series of spaced openings 103 formed through a side wall thereof, said openings being adapted to receive the inwardly directed locking finger 104 which extends inwardly through an aperture 105 formed through the side wall of the outer casing 1, said finger being secured to and supported by the pivoted finger or lever 106 which is pivoted upon the pin 107 between the ears 108 secured to the outer side wall of said outer casing 1. A guide or spring 109 is secured about the finger 106 and serves to limit its outward movement and to normally urge the same towards its innermost or locking position with the finger 104 extending through the desired and selected opening 103 in the inner side wall of the inner casing 5.

Operating rod 110 is slidably mounted between the guide brackets 111, and is provided with a knob 112 on its outer end which extends laterally and in front of the panel portion 7 of the outer casing. A stop pin 113 extends through the rod 110 and limits its outward movement, while the adjacent inner ends of said operating rod 110 and the adjacent end of the finger 106 are beveled off as at 114 and 115 respectively whereby when said operating rod 110 is pushed inwardly, the beveled portions 114 and 115 are engaged to swing the finger 106 outwardly to withdraw the locking pin or finger 104 from the particular opening 103 in the side wall of the inner casing 5, whereupon the said inner casing may be moved inwardly or outwardly and the locking finger again inserted within the appropriate opening 103 to hold the inner and outer casings in fixed and adjusted positions.

From the foregoing description, it will be apparent that there has been devised and provided a highly efficient form of guideomatic or film projecting device for projecting routes being traveled upon a suitable ground glass or opaque screen, said device being adapted to be secured adjacent the dash of an automobile or aeroplane, and provided with means whereby the film with the route indicated thereon may be slowly advanced as the vehicle or aeroplane advances, and the film may be stepped forwardly or backwardly by a step by step motion by operating the shift levers 54 or 62. Furthermore the film may be operated at any desired speed depending upon the speed of rotation of the operating shaft 81.

It is believed that the operation of the improved device is clearly set forth in the foregoing specification, and that further explanation is deemed unnecessary.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A visual route map for automobiles and aeroplanes comprising an outer casing, an inner casing slidably received therein, manually operable means for adjusting said inner casing longitudinally of said outer casing, means for locking said inner and outer casings together after having been adjusted to the desired position, a ground glass screen in the forward end of said inner casing, magnifying scanning means movable over any part of said screen, a projector supported on said inner casing, a lamp within said projector, a housing having a reflector about said lamp, means for resiliently and detachably securing said housing in said projector, route indicating film, manually operable means for moving said film through said projector in front of said lamp at a desired rate of speed in a forward or backward direction, and manually operable means for moving said film forwardly and backwardly in a step by step manner.

2. The combination of claim 1, wherein said first mentioned means includes longitudinally spaced openings formed in the inner casing, a lever pivoted to the outer casing adjacent said longitudinally spaced openings, an opening provided in said outer casing, a finger carried by said pivoted lever, a handle on said lever for actuating said lever, and a spring means carried by said lever for urging said finger through the opening provided in the outer casing and through any of the openings formed in the inner casing.

3. The combination of claim 1, wherein said means for resiliently and detachably securing said housing in said projector includes a plurality of spring clips carried by said housing and a plurality of slots in said projector for frictionally retaining said spring clips.

4. The combination of claim 1, wherein said means for moving said film at a desired rate of speed includes a first shaft rotatably journaled through said inner casing and disposed at one side of the housing, a film dispensing reel and a sheave terminally secured to said first shaft, a second shaft journaled through said inner casing and disposed at the other side of said housing, a film receiving reel secured to one end of said second shaft, a sheave secured adjacent the other end of said second shaft, an endless web entrained over the sheaves, a manually operable third shaft journaled in said inner casing, and enmeshing bevel gears secured to the ends of said second shaft and said third shaft.

5. The combination of claim 4, wherein said means for moving said film forwardly and backwardly in a step by step manner includes a pair of spaced ratchet wheels carried by said second shaft, pawls secured to said ratchet wheels, a pair of manually operable levers slidably journaled in said inner casing for engaging said pawls whereby the actuation of one of said pawls causes said second shaft to rotate in a forward direction and the actuation of the other of said pawls causes said second shaft to rotate in a reverse direction.

6. The combination of claim 5, wherein said first mentioned means includes longitudinally spaced openings formed in the inner casing, a lever pivoted to the outer casing adjacent said longitudinally spaced openings, an opening provided in said outer casing, a finger carried by said pivoted lever, a handle on said lever for actuating said lever, and a spring means carried by said lever for urging said finger through the opening provided in the outer casing and through any of the openings formed in the inner casing.

7. The combination of claim 6, wherein said means for resiliently and detachably securing said housing in said projector includes a plurality of spring clips carried by said housing and a plurality of seats in said projector for frictionally retaining said spring clips.

ROBERT O. WESTENFELDER.

REFERENCES CITED

The following references are of record in the file of this patent:

UNITED STATES PATENTS

| Number | Name | Date |
|---|---|---|
| 1,758,476 | Shaw | May 13, 1930 |
| 2,110,324 | Castle | Mar. 8, 1938 |
| 2,314,497 | Hargrave | Mar. 23, 1943 |
| 2,350,889 | Harman | June 6, 1944 |